United States Patent [19]
Rüschle et al.

[11] Patent Number: 5,188,579
[45] Date of Patent: Feb. 23, 1993

[54] MACHINE TOOL AND METHOD FOR OPENING AND CLOSING A GRIPPER

[75] Inventors: Eugen Rüschle, Mülheim; Rudolf Haninger, Seitingen-Oberflacht, both of Fed. Rep. of Germany

[73] Assignee: Chiron-Werke GmbH & Co. KG, Fed. Rep. of Germany

[21] Appl. No.: 791,997

[22] Filed: Nov. 14, 1991

[30] Foreign Application Priority Data

Nov. 20, 1990 [DE] Fed. Rep. of Germany ....... 4036915

[51] Int. Cl.$^5$ .................. B23Q 3/157; B25J 15/02
[52] U.S. Cl. .................................. 483/1; 294/116; 483/36; 483/902; 901/36
[58] Field of Search ............ 483/36, 38, 31, 1, 44, 483/48, 49, 51, 902; 901/39, 36; 294/116, 115, 110.1, 110.2; 414/736

[56] References Cited
U.S. PATENT DOCUMENTS

| | | | |
|---|---|---|---|
| 3,449,823 | 6/1969 | Jerve | 483/902 |
| 4,609,326 | 9/1986 | Roesler | 901/39 |
| 4,614,456 | 9/1986 | Cattani | 483/902 X |
| 4,845,834 | 7/1989 | Watson | 294/116 |
| 4,878,705 | 11/1989 | Arnquist | 294/116 |
| 4,879,802 | 11/1989 | Winkler et al. | 483/31 X |

*Primary Examiner*—William Briggs
*Attorney, Agent, or Firm*—Walter A. Hackler

[57] ABSTRACT

In the case of a machine tool having at least one tool changer for exchanging the tools of the machine tool, the tool changer comprises a gripper (13) provided with at least one movable jaw for form-locking engagement of the tools. The gripper (13) is further equipped with an actuating member (24), which is arranged for axial displacement in the longitudinal direction (30) and which, depending on its axial position, acts to open the at least one jaw for the purpose of inserting or removing the tools, or to close it for form-locking engagement of the tools. The actuating member (24) can be displaced into a first axial end position, by moving the gripper (13) asgainst a stationary stop (31) of the machine tool, for opening the at least one jaw, and can further be transferred, by closing means, into a second axial end position for closing the at least one jaw, as the gripper (13) is moved away from the stop (31). The closing means of this machine tool comprises a coupling mechanism (60) for selective coupling of the actuating member (24) and the stop (31). In addiiton, the invention describes a method for opening and closing a gripper, which is carried out on the machine tool.

13 Claims, 5 Drawing Sheets

MACHINE TOOL AND METHOD FOR OPENING AND CLOSING A GRIPPER

The present invention relates to a machine tool having at least one tool changer for exchanging the tools of the machine tool, the tool change comprising a gripper provided with at least one movable jaw for form-locking engagement of the tools and being equipped with an actuating member, which is arranged for axial displacement in the longitudinal direction and which, depending on its axial position, acts to open the at least one jaw for the purpose of inserting or removing the tools, or to close it for form-locking engagement of the tools, and which can be displaced into a first axial end position, by moving the gripper against a stationary stop of the machine tool, for opening the at least one jaw, and can be further transferred, by closing means, into a second axial end position for closing the at least one jaw, as the gripper is moved away from the stop.

A machine tool of the before-described type has been known from DE-OS-3 717 201.

The invention further relates to a method for opening and closing a gripper which is provided on a tool changer intended for exchanging tools of a machine tool and which is provided with at least one movable jaw for form-locking engagement of the tools, and further with an axially displaceable actuating member which opens and closes the at least one jaw in response to its axial movement, comprising the steps of moving the gripper against a stationary stop of the machine tool, in order to transfer the actuating member into a first axial end position for opening the at least one jaw, and moving the gripper away from the stop, whereby the actuating member is transferred, via closing means, to its second axial end position, for closing the at least one jaw.

A method of this kind is carried out by the machine tool known from DE-OS-3 717 201.

In the case of this known machine tool, a plurality of machining operations are carried out in succession on a plurality of workpieces in a program-controlled way. The different tools are stored in a magazine ready for use so that for changing over from one machining operation to the next, the tool previously used is removed by means of a gripper provided on a tool changer and the new tool required for the next machining operation can be taken from the magazine and mounted in the spindle. The tool changer comprises for this purpose a movable arm which carries the gripper on its free end.

The grippers of the known machine tool are provided each with two fixed jaws between which the respective tool can be guided in form-locking engagement in a direction perpendicular to its axis. In addition, two movable jaws are provided which in their closed position enclose between them, in form-locking engagement, the tool which is held between the fixed jaws. In the open condition of the movable jaws, the respective tool can be removed from the fixed jaws, or can be introduced between the latter, respectively.

The pivoting movement of the movable jaws is effected by an actuating member which is supported on the gripper for longitudinal displacement and whose axial movement is translated into an opening movement of the jaws, via a positively controlled opening mechanism, and into a closing movement of the jaws, via a likewise positively controlled closing mechanism. For carrying out the opening action, the gripper is moved against a stationary stop on the machine tool in such a Way that the actuating member is displaced to its first axial end position. The actuating member is loaded by a compression spring so that when the gripper moves away from the stationary stop, the actuating member is urged into its second axial end position, in which it retains the movable jaws in the closing position.

From the above it appears that the force of the compression spring is utilized for closing the jaws and for keeping the jaws closed. Consequently, the holding force and the closing force are determined by the tension force of the compression spring.

It is a disadvantage of the known gripper that the closing force and the holding force Will diminish When the tension force of the spring slackens, and will even be fully lost if the spring should break. This means that the grippers of the known machine tool are dependent on the reliability of the compression spring, as regards the closing of the movable jaws.

Moreover, it often happens that the force of the spring is not sufficient to close the jaws. This may be the case in particular When the closing mechanism gets blocked by chips entering the gripper. When the gripper is displaced in this case, the tool may fall off the gripper and may cause damage to the machine tool.

In addition, it may happen that a tool is not properly ejected from the spindle, or is transferred to the gripper in oblique position. If the tool has not been ejected, the gripper will leave its position without carrying off the tool. When the next tool is then changed in, a collision between the next tool to be changed in and the previous one which has been left behind in the spindle will be the necessary consequence. Likewise, if a tool has been gripped by the gripper in oblique position, this also will cause damage, because the tool cannot be introduced properly into the spindle for the next operation.

Consequently, consequential damage may be encountered in the case of the known machine tool because the gripper has not been closed or because a tool has not been ejected, or has been gripped in oblique position. The known method, where the gripper is closed only by the force of the spring as it is moved away from the stationary stop, is connected with just the same disadvantages.

Now, it is the object of the present invention to improve a machine tool and a method of the type described above in such a way as to eliminate the before-mentioned disadvantages and in particular to guarantee safe closing of the gripper, while keeping the structure simple. In addition, the invention is to provide the possibility to retrofit existing machine tools in such a way as to render them capable of carrying out the method according to the invention.

As regards the before-mentioned machine tool, this object is achieved by the fact that the closing means comprise a coupling mechanism for selective coupling of the actuating member and the stop.

As regards the before-mentioned method, this object is achieved by the fact that the following additional steps are provided:

coupling the actuating member with the stop by moving the gripper against the stop;

pulling the actuating member, with the stop connected to it, into its second axial end position, by moving the gripper away from the stop; and disconnecting the actuating member, which occupies its second axial end position, from the stop by moving the gripper further away from the stop.

This solves the object underlying the invention fully and perfectly. For, the coupling mechanism couples the actuating member with the stop when the gripper is moved against the stop, so that when it is moved away the actuating member is pulled into its second axial end position. Once the actuating member occupies its second axial end position, it is disconnected from the stop. This may be achieved either by a suitable gripper movement or by means of an externally operated mechanism such as a compressed-air mechanism. Consequently, the force of a spring is no longer required for closing the gripper; rather, the gripper movement as such acts not only to open the jaw, but also to close it again during the movement away from the stop.

According to a preferred embodiment of the novel machine tool, the coupling mechanism is an automatic coupling mechanism Which automatically connects the actuating member and the stop as the gripper is moved against the stop, and which automatically releases the actuating member, which occupies its second axial end position, from the stop as the gripper moves away from the stop.

This feature is of advantage insofar as no external control is required for the coupling mechanism. And there is also no need for a complex movement of the gripper to effect the coupling and uncoupling actions. The coupling mechanism may, for example, contain a snap-in mechanism or may make use of magnetic forces of attraction.

It is further preferred in the case of the novel machine tool if the actuating member closes the at least one jaw in a positively controlled manner.

This feature provides the advantage, which is known as such, that the actuating member follows directly the closing movement of the at least one jaw, and vice versa. In connection with the present invention, however, this feature provides the additional advantage that the actuating member can assume its second axial end position only on the condition that the gripper is actually closed. When a tool is gripped obliquely, this is not possible. However, considering that the automatic coupling mechanism will disconnect the actuating member from the stop only When it has reached its second axial end position, it is no longer possible in the case of the novel machine tool for a gripper to leave a stop with a jaw not fully closed. Any such malfunction is, therefore, excluded. Consequently, the novel method guarantees that a gripper definitely can be moved away from the stationary stop only when it is closed, and excludes, therefore, any consequential damage caused by a gripper which has not been fully closed. If the tool cannot be ejected from the spindle, the gripper will remain attached to the spindle, a condition which admittedly leads to an interruption of Work, but avoids any consequential damage that may otherwise be caused When a tool has not been ejected and the gripper has nevertheless been withdrawn.

It is further preferred in this connection if the coupling mechanism comprises a first hook element, which is connected to the actuating member, and a second hook element, which is associated with the first hook element and is connected to the stop, one of the two hook elements being movable laterally in a direction extending at an angle to the longitudinal direction of the actuating member, and control means being provided for releasing or blocking the lateral movement of the one hook element in response to the axial position of the actuating member.

This feature is of advantage in particular under constructional aspects, since in this case the coupling mechanism is controlled practically in response to its position. An evading movement of the hook, which may for example be spring-loaded, during the movement against the stop brings the two hook elements in engagement one with the other, whereby the actuating member and the stop are positively locked. Once the actuating member has been pulled into its second axial end position, the control means releases the previously blocked movable hook element so that the latter is permitted to free itself from the other hook element by a lateral movement.

For closing the gripper, it is only necessary to move the gripper away from the stop. The closing force for the movable jaw is determined exclusively by the force with which the gripper movement is performed. If the jaw gets blocked, for example because the positively controlled closing mechanism is soiled or the tool has not been ejected from the spindle, the gripper remains attached to the stop. As has been mentioned before, there does not occur any consequential damage, except that the machining operation is interrupted.

According to a further preferred embodiment of the invention, the coupling mechanism is provided with guide faces which bring the movable hook element into or out of engagement with the other hook element in response to the relative movement of the gripper relative to the stop.

This feature is of advantage under constructional aspects, as the very movement of the gripper controls not only the releasing movement and the detachment of the actuating member, but also the connection of the actuating member to the stop. There is no need for other power sources, such as a restoring spring for the movable hook element.

Further, it is preferred in this connection if the movable hook element comprises a pin which can be displaced transversely to the longitudinal direction of the actuating member and which is provided with counter-faces coacting with the guide faces.

This feature, too, is of advantage under constructional and under safety aspects, because a pin, which is moved to and fro, is less prone to getting jammed than a hook which performs a pivoting movement. For, a movable hook element might get stuck in the pivoted position, after having been released from the other hook element, so that when the stop is approached again by a gripper, the two hook elements cannot engage each other. This risk does not exist in the case of a sliding pin.

According to a further preferred variant, the movable hook element coacts with a pivot which acts to limit the movement of the pin in both directions.

This very simple measure, under constructional aspects, prevents the movable pin in a very advantageous way from getting detached from the second hook element.

Further, it is preferred if the pin is supported on the stop, and the control means comprises a counter-element arranged on the gripper and having a holding surface facing the first hook element, which abuts against one end of the pin when the first and the second hook elements are in engagement one with the other.

This feature is of advantage under constructional aspects since it permits existing machine tools to be retrofitted. This can be achieved simply by arranging a movable pin on the existing stationary stog, and fixing on the gripper a counter-element provided with the holding surface, and mounting a first hook element on the actuating member.

In connection with this embodiment of the invention, it is further preferred if a lug with a first inclined guide surface facing the gripper is provided on the first hook element, which guide surface is spaced a greater distance from the gripper than an upper edge of the holding surface, when the actuating member occupies its second axial end position, and coacts with one of the counter-surfaces of the pin.

This feature permits the coupling mechanism to be unlocked by simple constructional means and in an advantageous way. The holding surface releases the pin at once when the actuating member has been pulled into its second axial end position, and when the gripper is moved further away from the stop, the first guide surface of the lug acts to push the pin to the side so that the actuating member is released from the stop.

In addition, it is preferred if the counter-element is provided, above the upper edge of the holding surface, with a second oblique guide surface which points in upward direction, away from the gripper and toward the lug, and which comes to engage a counter-surface of the pin and to push the latter beneath the lug as the gripper is moved against the stop.

This simple arrangement, under constructional aspects, acts to sort of thread in the pin between the first holding element, or its lug, and the counter-element.

Moreover, it is preferred if another guide surface each is provided on the lug and the counter-element, respectively, above the first and the second guide surfaces, which further guide surfaces come to act upon the counter-surfaces of the pin when the gripper is moved against the stop, in such a way that the pin comes to rest against the second guide surface of the counter-element.

This feature provides the advantage that the pin can be "presented" to the gripper in any position, being initially displaced by the further guide surfaces in such a manner that as the gripper gets closer to the stop, it will come to engage the second guide surface of the counter-element which then acts to push the pin underneath the lug.

In connection with this embodiment of the invention, it is further preferred if the machine tool comprises centering means for restraining the gripper laterally as it is moved toward or a Way from the stop.

It is the particular advantage of this feature that the gripper cannot be displaced laterally by transverse forces that may possibly arise during engagement of the two hook elements and/or when the actuating member is pulled into its second axial end position. The transverse forces, which may possibly be encountered, do not have to be absorbed by the tool changer, but are transmitted to the centering means.

This measure, which has been known before in connection with existing machine tools, makes it possible to adapt existing machine tools for the method according to the invention, it being only necessary to provide them with the coupling means comprising the first and the second hook elements and the counter-element.

It is further preferred if the method according to the invention is carried out on a machine tool according to the invention.

Other advantages of the invention Will appear from the specification and the attached drawing.

It is understood that the features that have been described before and will be explained hereafter may be used not only in the described combinations, but also in any other combination, or individually, without leaving the scope and intent of the present invention.

One embodiment of the invention will now be described in more detail with reference to the drawing in which.

Figure 1:
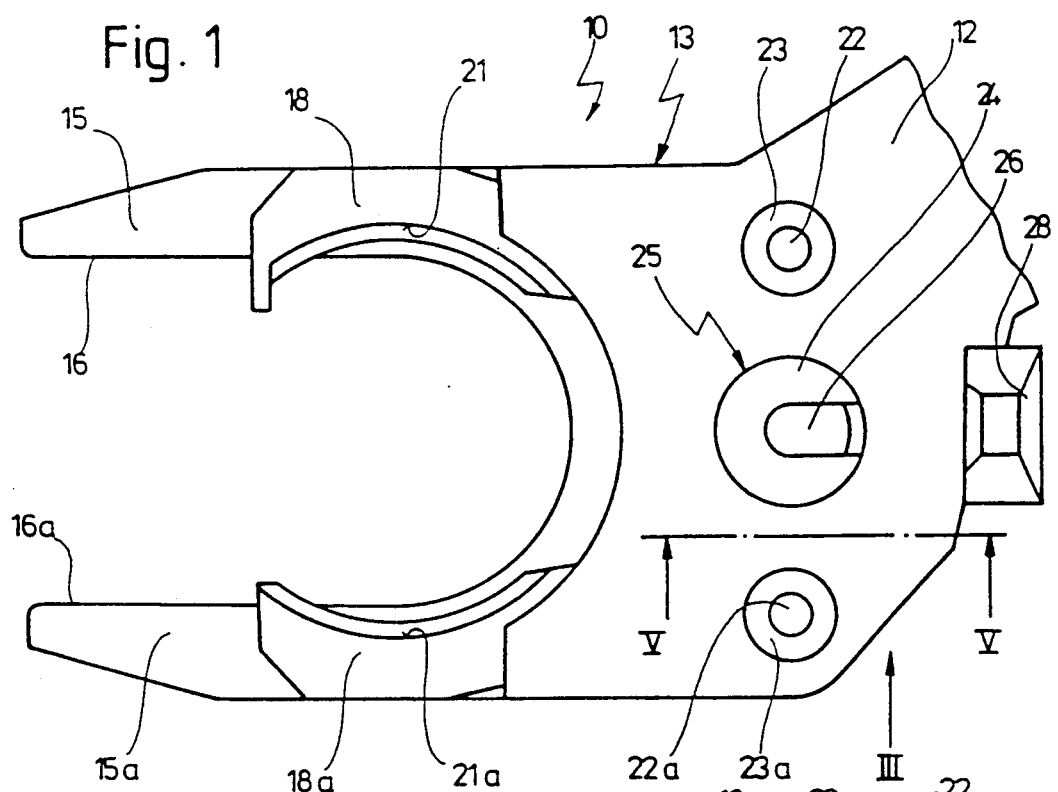
FIG. 1 shows a top view of a gripper of a machine tool according to the invention in closed position.
Figure 2:
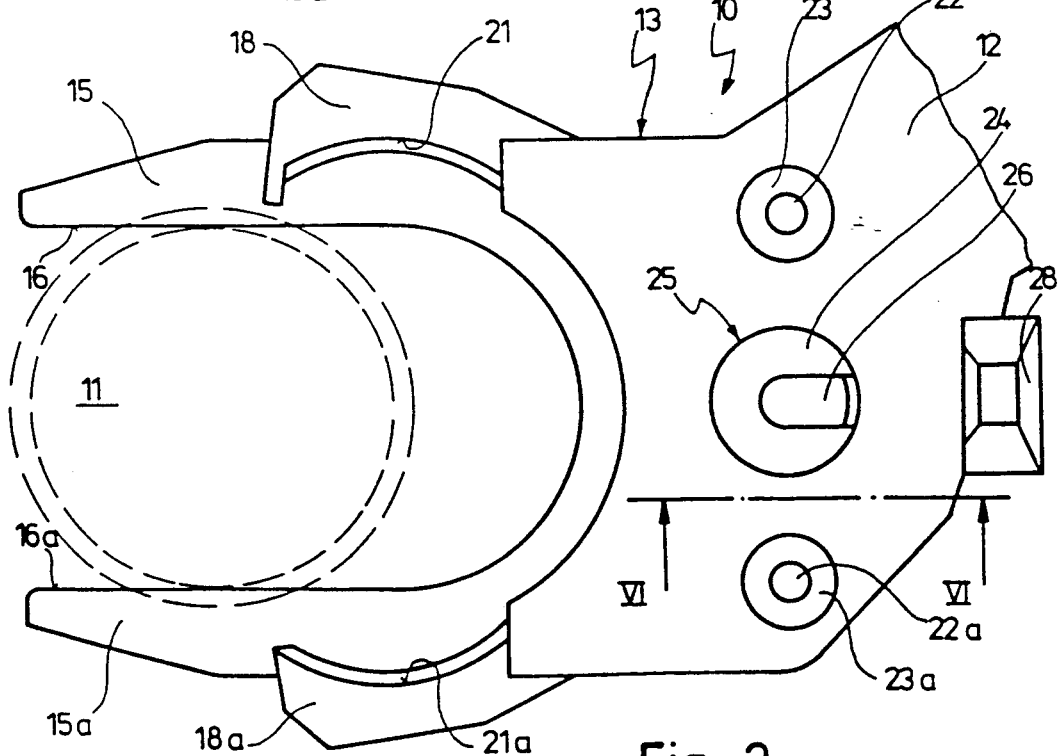
FIG. 2 shows a representation similar to that of FIG. 1, but in open position.

Regarding now FIGS. 1 and 2, a tool changer intended for gripping and holding a tool 11, indicated diagrammatically in FIG. 2, is identified in its entirety by reference numeral 10. An arm 12 of the tool changer 10 is indicated in FIGS. 1 and 2 only in part, extending generally outside of the drawing plane. In contrast, a gripper 13 of the tool changer 10, which is arranged on the arm 12, extends in the drawing plane.

Reference numerals 15, 15a identify two fixed jaws of the gripper 13. The jaws 15 are open at their front end and provided with guides 16, 16a, which extend in parallel to each other and which guide between them the tool 11, in axial direction and in form-locking engagement. The tool 11 is provided for this purpose with a conventional axial profile.

The gripper 13 further comprises two movable jaws 18, 18a arranged above the fixed jaws 15, 15a. In the illustration of FIG. 1, the movable jaws 18 are closed, while in FIG. 2 they are shown in open position in which the tool 11 can be introduced or removed. The movable jaws 18, 18a are equipped with holders 21, 21a which exhibit the shape of circular arcs and which are likewise adapted to the known outer contour of the tool 11. In the closed condition of the jaws 18, 18a, a tool 11 received in the gripper 13 is held radially by the holders 21, 21a, which embrace them in form-locking engagement.

The gripper 13 is further equipped with elements 22, 22a which serve for centering the gripper 13 below a spindle of the machine tool in a manner which will be described in more detail further below. Additionally, the elements 22, 22a also represent axes 23, 23a about which the movable jaws 18, 18a are pivoted for opening or closing. This pivoting movement of the movable jaws 18, 18a is effected by an actuating member 24 which is supported on the gripper 13 for displacement in its longitudinal direction, and which can be moved into and out of the plane of drawing in the embodiment of the invention represented in FIGS. 1 and 2. This axial movement of the actuating member 24, being in this case a stud 25, is translated into the closing and opening movement of the movable jaws 18, 18a, in a manner known as such, via a positively controlled closing mechanism and a likewise positively controlled opening mechanism. Mechanisms of this type, which translate an axial movement into a pivoting movement, have been known for example from the before-mentioned DE-OS-3 717 201 the disclosure of which is fully incorporated herein by reference.

The stud 25 carries a first hook element 26 which coacts with a counter-element 28, Which is provided on the gripper and which will be described in more detail further below, in order to transfer the open gripper illustrated in FIG. 2 into its closed position illustrated in FIG. 1.

Figure 3:
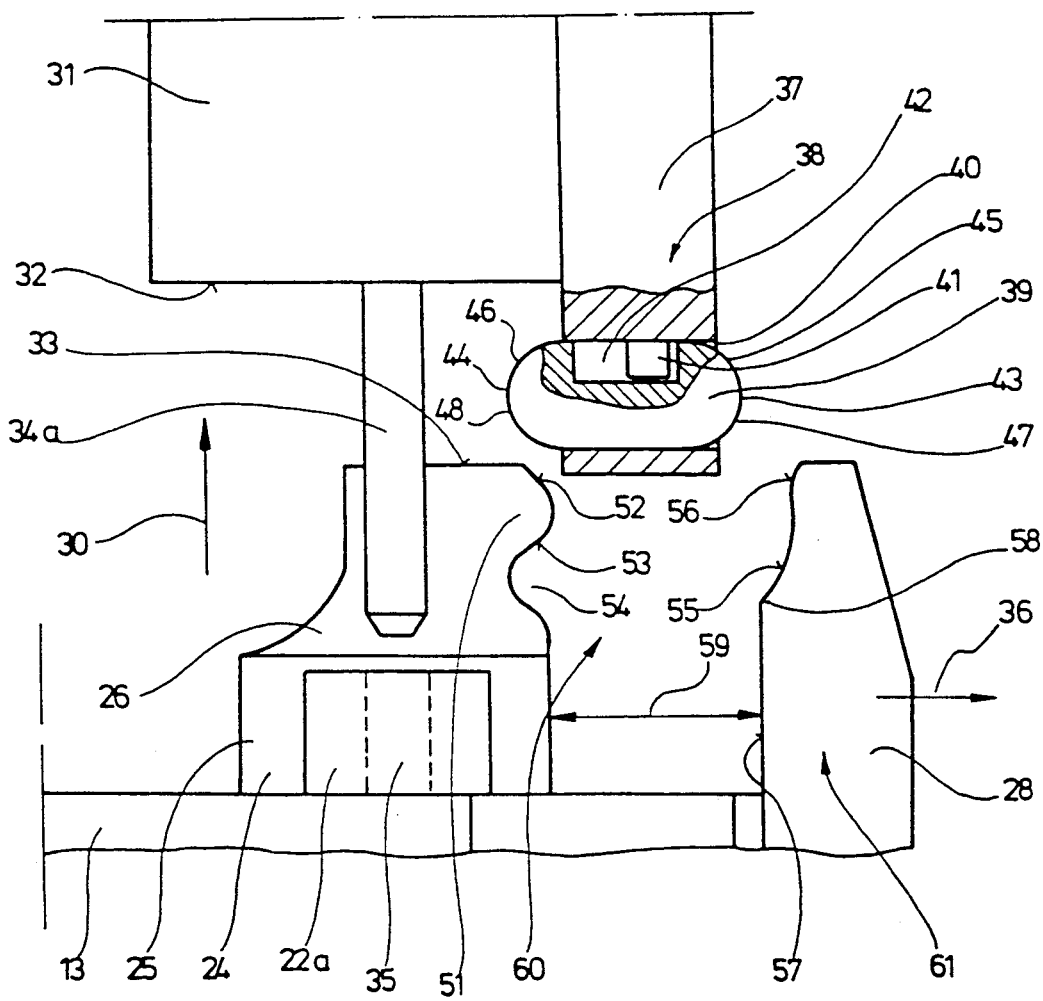
FIG. 3 shows a side view, in enlarged scale and partly broken away, of the closed gripper according to FIG. 1, viewed in the direction indicated by arrow III in FIG. 1, illustrating a first operating position where the gripper is still spaced from a stop.

For opening the closed gripper 13, the latter is moved against a stationary stop 31 of the machine tool in a direction indicated by arrow 30 in FIG. 3. The stop 31 is equipped with a stop surface 32 which comes to abut against a head surface 33 of the first hook element 26 when the gripper 13 is moved against the stop 31, thereby displacing the stud 25 into the drawing plane of FIGS. 1 and 2, and in a direction opposite to arrow 30 in FIG. 3. FIG. 3 shows that guide pins 34, 34a are arranged on the machine tool in the neighborhood of the stop 31, although in FIG. 3 only the guide pin 34a can be seen. The guide pins 34, 34a extend in a direction parallel to the direction 30, and come to engage bores 35 in the elements 22, 22a when the gripper 13 is moved against the stop 31. This has the effect to center the gripper 13 with respect to the stop 31, and to prevent any lateral movement of the gripper 13 in the transverse direction indicated by 36. Any transverse forces acting in the transverse direction 36 are absorbed by the elements 22a serving as centering means, and by guide pins 34a.

As can be further seen in FIG. 3, a second hook element 38, which is arranged on a projection 37 in the neighborhood of the stop 31, comprises in the illustrated embodiment a pin 39 which is arranged for longitudinal displacement in the transverse direction 36. The pin 39, Which is guided in a bore 40 of the projection 37, coacts with a pivot 41 arranged on the projection 37, which in its turn engages a recess 42 of the pin 39. The pivot 41 prevents in this way the pin 39 from getting detached from the bore 40 laterally, in the transverse direction 36 or in opposite direction.

The pin 39 comprises two spherical ends 43 and 44 which project laterally from the bore 40 and which are provided each with a counter-surface 45 and 46, respectively, pointing in upward direction, and a counter-surface 47 and 48, respectively, pointing in downward direction. The counter-surfaces 45, 46, 47, 48 coact—in a manner which will be described in more detail further below—with guide surfaces provided on parts of the gripper 13.

The first hook element 26, for example, is equipped with a lug 51 which faces the counter-element 28 and which is provided with an upper inclined guide face 52 pointing in upward direction and away from the gripper 13, and an inclined lower guide face 53 pointing in downward direction and toward the gripper 13. The convex lug 51 with its guide faces 52 and 53 is followed, in downward direction, by a concave recess 54 whose shape corresponds roughly to that of the spherical end 54 of the pin 39.

The counter-element 28 is also provided With two guide faces 55 and 56, the upper guide face 56 being located approximately at the same level as the guide face 52 of the lug 51 when the stud 25 occupies its axial end position illustrated in FIG. 3, in which the jaws 18, 18a of the gripper 13 are closed.

When the stud 25 occupies this position, the guide face 55 is located below the lug 51, pointing obliquely in upward direction, toward the lug 51 and away from the gripper 13. Below the guide face 55, a holding surface 57 extending in parallel to the direction 30 is provided on the counter-element 28, which holding surface 57 coacts with the spherical end 53 of the pin 39 in a manner which will be described more fully below. The holding surface 57 transitions into the guide face 55, forming with the latter an upper edge 58 which is spaced from the gripper 13 a smaller distance than the guide face 53, measured in the direction 30, when the stud 25 occupies its position illustrated in FIG. 3.

The spacing between the stud 25 and the holding face 57, measured in the transverse direction 36, is indicated at 59 and is a little smaller than the extension of the pin 39, measured in the transverse direction 36.

The first hook element 26, the second hook element 38 and the counter-element 28 will be described insofar as their function as a coupling means 60 for connecting selectively the actuating member 24 with the stop 31 is to be explained hereafter by reference to FIGS. 4 to 6. In should be noted in this connection that the counter-element 28, with its holding face 57 and the lower guide face 55, serves as control means 61 for the lateral movement of the hook element 38 or the pin 39.

Figure 4:
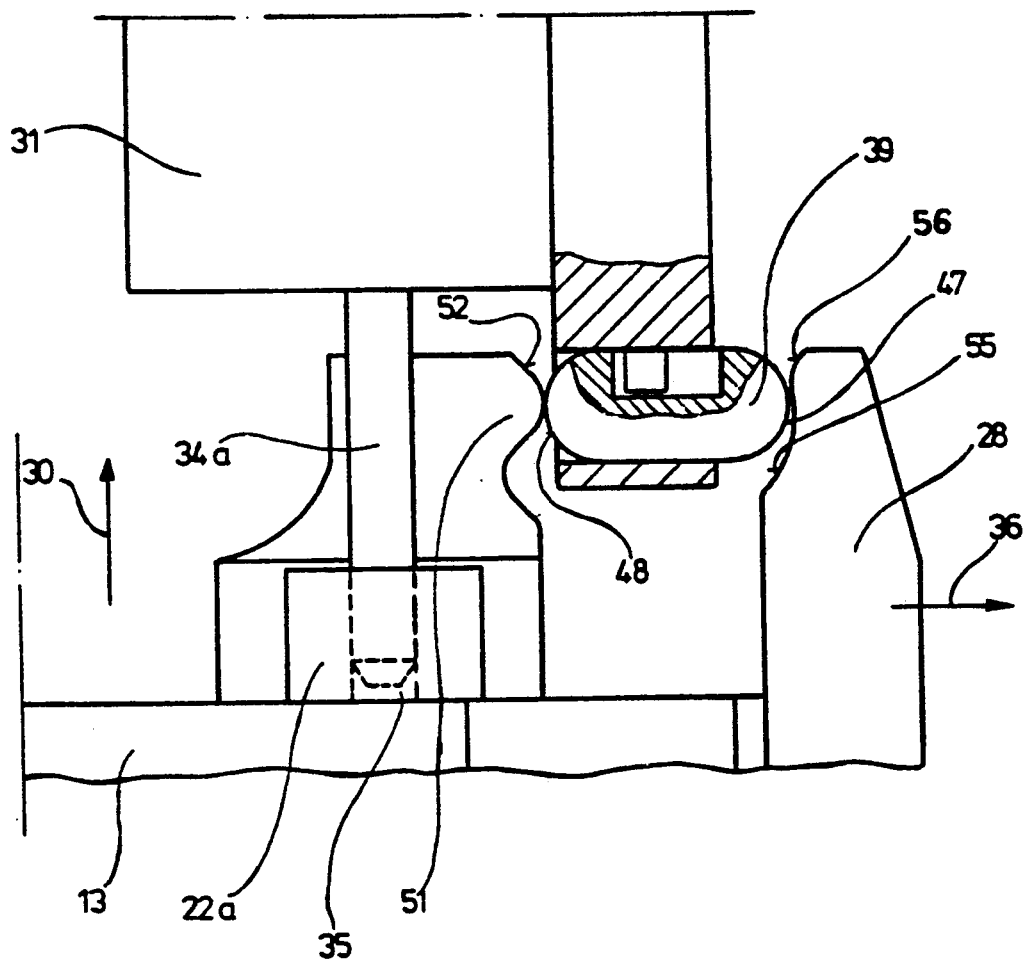
FIG. 4 shows a side view similar to that of FIG. 3, but where the gripper has been approached to the stop so that the pin is located between the first hook element and the counter-element.

For opening the jaws 18, 18a, the gripper 13 is advanced further toward the stop 31, in the direction 30, whereby it gets into the position illustrated in FIG. 4. The guide faces 52 and 54, which coact with the counter-faces 58 and 47, have pushed the pin 39 to the right in FIG. 4, compared with their position in FIG. 3, and during the further movement of the gripper 13 toward the stop 31, it has been introduced between the lug 51 and the counter-element 58. As the gripper 13 is moved further toward the stop 31, in the direction 30, the guide face 55 comes to rest against the counter-surface 54 and to displace the pin 39 in a direction opposite to the transverse direction 36, whereby the spherical end 44 comes to engage the recess 54, as illustrated in FIG. 5. When the gripper 13 occupies this position relative to the stop 31, the stop surface 32 is in contact with the head surface 33 so that when the gripper 13 is moved further in the direction 30, the stud 25 is pushed into the gripper 13. This axial movement of the stud 25 is translated, by a conventional opening mechanism, into the pivoting movement of the movable jaws 18, 18a which will, consequently, open. During this further approaching movement, the spherical end 43 of the pin 39 comes to rest against the holding surface 57 of the counter-element 28, as illustrated in FIG. 6. In this position of the gripper 13, relative to the stop 31, the pin 39, being positioned between the lug 51 and the counter-element 28, is fixed in transverse direction 36 by the recess 54 and the holding surface 58 so that any displacement of the pin 39 is prevented.

Due to the combined action of the lug 51 and the counter-element 28 on the one hand and the pin 39 on the other hand, the stud 25 is coupled with the stop 31 in form-fitting engagement. When the gripper 13 is now moved away from the stop 31, in a releasing direction 63 opposite to the direction 30, the gripper 13 will entrain the stud 25 into its second axial end position whereby the movable jaws 18, 18a are closed. Any lateral movement of the gripper 13 away from the stop 31 is prevented by the centering means illustrated in FIGS. 3 and 4. As the gripper 13 is moved in the direction 63, the counter-surface 36 of the pin 39 comes to rest against the guide face 53 of the lug 51, whereby the lug 51 is coupled with the stop 31. When the gripper 13 is moved away, the spherical end 43 of the pin 39 slides past the holding surface 57, Which latter prevents the pin 39 from evading in the transverse direction 36.

Figure 5:
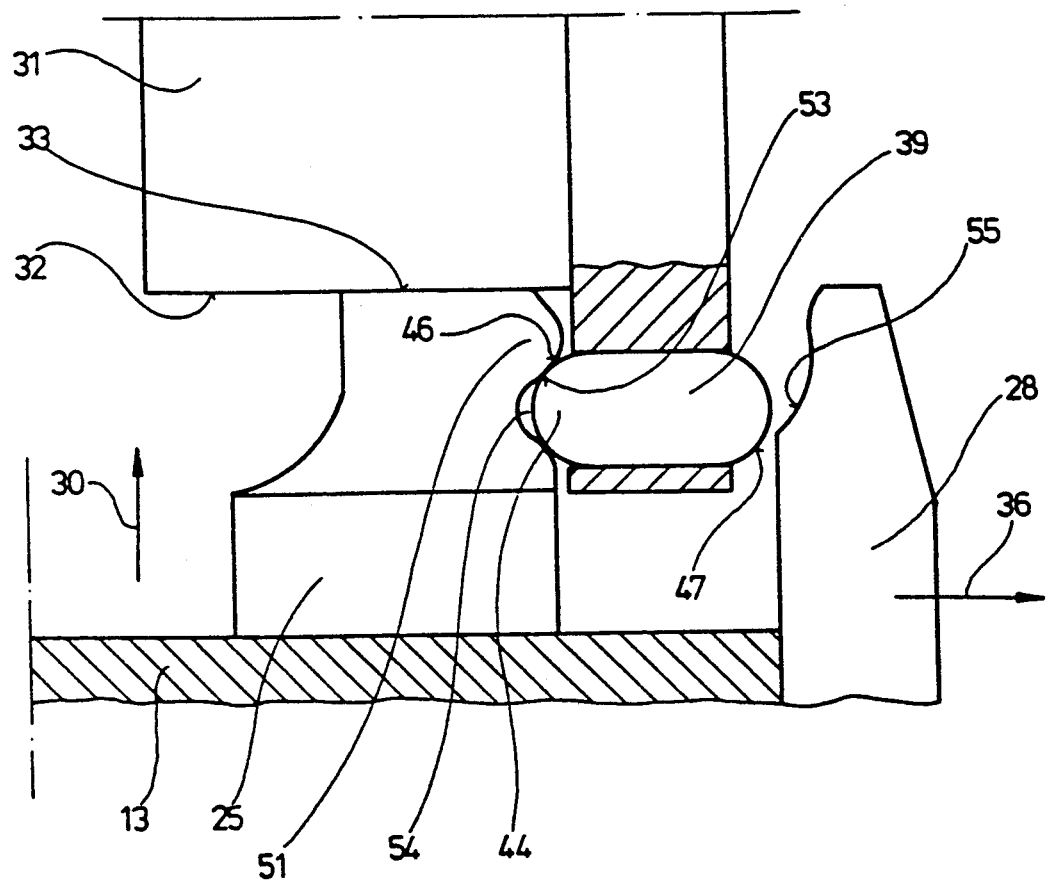
FIG. 5 shows a sectional view in enlarged scale, taken along line V—V in FIG. 1, illustrating the condition where the gripper has been approached to the stop to a position where the actuating member rests against the stop.
Figure 6:
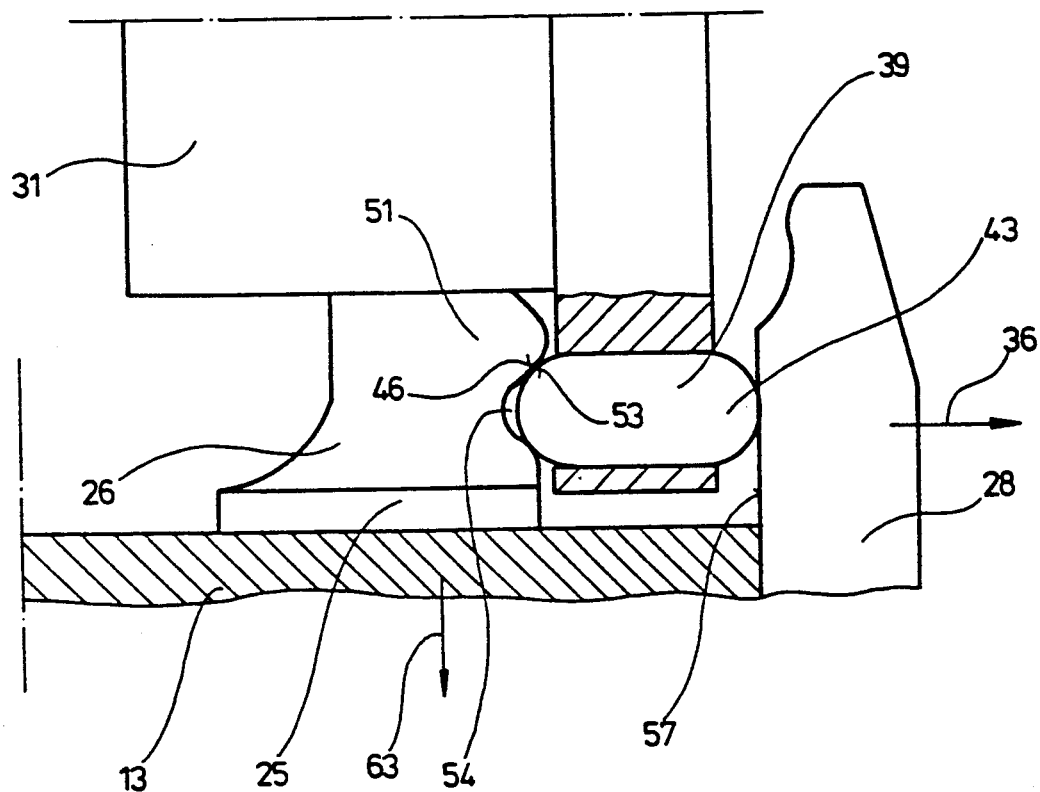
FIG. 6 shows a sectional view of the open gripper similar to FIG. 2, along line VI—VI in FIG. 2.

The gripper 13 now occupies again its position illustrated in FIG. 5, in which the stud 25 occupies again its second axial end position, having closed the movable jaws 18, 18a via the closing mechanism.

In the event the closing mechanism should become jammed, or the tool 11 should be received in the gripper 13 in a manner which prevents the movable jaws 18, 18a from getting closed —this situation is illustrated in FIG. 2—then the stud 52 cannot be transferred completely into its second axial end position, due to the positive control. In any such case, the pin 39 remains stuck between the recess 54 and the holding surface 54 so that the gripper 13 cannot get clear of the stop 31, but will remain stuck in position. This will of course interrupt the machining operation, but the consequential damage which otherwise may be caused by the fact that the gripper cannot be closed or that a tool 11 is received in the gripper in oblique position, is avoided.

However, when the jaws 18, 18a close in the normal way, then the pin 39 is brought out of engagement, laterally, with the lug 51, due to the combined action of the counter-surface 46 and the guide face 53. The pin 39 then reaches its position illustrated in FIG. 5 and thereafter its position illustrated in FIG. 4, in Which the coupling mechanism 60 has opened again automatically. Thus, the coupling mechanism 60 has been opened by the mere fact that the gripper 13 has been moved away from the stop 31 and the stud 25 has been retracted in that connection. In the reverse case, the connection between the actuating member 24 and the stop 54, which is effected by threading-in the pin 39 between the lug 51 and the counter-element 28, has been brought about similarly by the mere movement of the gripper—in this case toward the stop 31.

We claim:

1. A machine tool comprising:
   a working spindle;
   a stationary stopper element;
   a toolholder magazine;
   transfer means for transferring toolholders between said toolholder magazine and said working spindle, said transfer means having a movable gripper for gripping said toolholders, said gripper having a hand, comprising:
   at least one movable jaw for form-locking engagement of said toolholders;
   actuating means being displaceable along an axis, said actuating means in a first axial position moving said jaw into an opening position for inserting a toolholder from said hand or removing said toolholder from said hand, respectively, and, in a second axial position moving said jaw into a closing position for a form-locking engagement of said toolholder, said transfer means being arranged for displacing said hand with said actuating means against said stationary stopper element for urging said actuating means into said first axial position and for removing said hand with said actuating means from said stationary stopper element for urging said actuating means into said second axial position; and
   coupling means for selectively coupling said actuating means with said stationary stopper element.

2. The machine tool of claim 1 wherein said coupling means automatically couples said actuating means with said stationary stopper element when said gripper is moved against said stationary stopper element, and which automatically releases said actuating means in said second axial position from said stationary stopper element when said gripper moves away from said stationary stopper element.

3. The machine tool of claim 1 wherein said actuating means forcibly closes said jaw.

4. The machine tool of claim 3 wherein said coupling means comprises a first hook element being connected with said actuating means, and a second hook element associated with said first hook element and being connected with said stationary stopper element, one of said hook elements being movable laterally in a direction extending at an angle to said axis, control means being provided for releasing or blocking, respectively, said lateral movement of said one hook element responsive to the axial position of said actuating means.

5. The machine tool of claim 4 wherein said coupling means is provided with guide faces bringing said movable hook element into or out of engagement, respectively, with said other hook element depending on a movement of said gripper relative to said stationary stopper element.

6. The machine tool of claim 5 wherein said movable hook element comprises a pin being arranged for being displaced transversely to said axis and being provided with counter-faces coacting with said guide faces.

7. The machine tool of claim 6 wherein said movable hook element coacts with a pivot acting to limit movement of said pin in both directions.

8. The machine tool of claim 6 wherein said pin is supported on said stationary stopper element, said control means comprising a counter-element arranged on said gripper and having a holding surface facing said first hook element and abutting against one end of said pin when said first and said second hook elements are in engagement with each other.

9. The machine tool of claim 8 wherein a lug with a first inclined guide surface facing said gripper is provided on said first hook element, said guide surface being spaced a greater distance from said gripper than an upper edge of said holding surface, when said actuating means occupies its second axial position and coacts with one of said counter-surfaces of said pin.

10. The machine tool of claim 9, wherein said counter-element is provided above said upper edge of said holding surface with a second oblique guide surface pointing in an upward direction away from said gripper and towards said lug, said counter-element coming to engage a counter-surface of said pin to push said pin beneath said lug when said gripper is moved against said stationary stopper element.

11. The machine tool of claim 10 wherein one other guide surface each is provided on said lug and on said counter-element, respectively, above said first and said second guide surfaces, said other guide surfaces coming to act upon said counter-surfaces of said pin when said gripper is moved against said stationary stopper element, such that said pin comes to rest against said second guide surface of said counter-element.

12. The machine tool of claim 1 comprising centering means for restraining said gripper laterally as it is moved toward or away from, respectively, said stationary stopper element.

13. A method for opening and closing a gripper provided on a tool changer for exchanging tools of a machine tool, said gripper being provided with at least one movable jaw for a form-locking engagement of said tools, and being, further, provided with an axially displaceable actuating means opening and closing, respectively, said jaw in response to an axial movement of said actuating member, the method comprising the steps of:

moving said gripper against a stationary stopper element of said machine tool to actuate a coupling means, whereby said actuating means is coupled with said stationary stopper element by moving said gripper against said stationary stopper element, for transferring said actuating means into a first axial end position for opening said jaw;

moving said gripper away from said stationary stopper element and pulling said actuating means with said stationary stopper element coupled to it, into a second axial end position thereof, by moving said gripper away from said stationary stopper element, for closing said jaw; and disconnecting said actuating means in its second axial end position from said stationary stopper element by moving said gripper further away from said stationary stopper element.

* * * * *